United States Patent [19]

Wheeler et al.

[11] Patent Number: 5,673,782
[45] Date of Patent: Oct. 7, 1997

[54] ARTICLE ROTATE DEVICE AND METHOD FOR SAME

[75] Inventors: Tracy Eugene Wheeler, Terre Haute; Rick Lee Tiefel, Clay City, both of Ind.

[73] Assignees: Sony Corporation, Tokyo, Japan; Digital Audio Disc Corporation, Terre Haute, Ind.

[21] Appl. No.: 551,222

[22] Filed: Oct. 31, 1995

[51] Int. Cl.$^6$ ............................................ B65G 47/24
[52] U.S. Cl. ...................... 198/411; 198/415; 198/416
[58] Field of Search ........................ 198/411, 414–416

[56] References Cited

U.S. PATENT DOCUMENTS

| | | | |
|---|---|---|---|
| 2,728,307 | 12/1955 | Rhodes | 198/416 |
| 3,389,778 | 6/1968 | Kovacs et al. | 198/415 |
| 3,508,640 | 4/1970 | Deagood et al. | 198/411 |
| 3,603,446 | 9/1971 | Maxey et al. | 198/415 |
| 3,758,104 | 9/1973 | Daily | 198/415 |
| 4,607,743 | 8/1986 | Elam | 198/415 |
| 4,930,615 | 6/1990 | Nash | 198/411 |
| 4,979,606 | 12/1990 | Usui | 198/369 |

*Primary Examiner*—Joseph E. Valenza
*Attorney, Agent, or Firm*—Peter C. Toto; Jerry A. Miller; Pasquale Musacchio

[57] ABSTRACT

An apparatus for rotating an article includes a first housing member mountable on a side of the article conveyor, and a second housing member mountable on the opposite side of the article conveyor. A motor having a shaft is mounted on the first housing member. The motor is arranged to drive a frictional drive roller. The frictional drive roller in turn drives a first end portion of an approaching article. A pin is mounted on the second housing member and arranged to contact a second end portion, i.e., a second end portion opposite the first end portion, of the article while the frictional drive roller drives the first end portion. The pin functions to inhibit motion of the second end portion and thereby establishes a pivot position about which the article rotates approximately ninety degrees.

6 Claims, 7 Drawing Sheets

ARTICLE ROTATE DEVICE AND METHOD FOR SAME

FIELD OF THE INVENTION

The present invention relates generally to an apparatus for rotating an article and more particularly to an apparatus for rotating an article being transported on an article conveyor.

BACKGROUND OF THE INVENTION

Article conveyors, such as conveyor belts, are typically used in manufacturing facilities for moving articles from one piece of equipment to the next where different operations may be performed on the articles. For example, in the case of manufacturing optical discs such as compact discs, formed discs are placed in so-called jewel cases. The jewel cases are then processed by several pieces of equipment, including labelers, wrappers and case packers. Wrappers apply a plastic film wrap to the jewel cases, labelers place stickers on the jewel cases, and case packers place several jewel cases into boxes for shipping. Often such equipment requires the jewel cases to be oriented in a particular fashion, e.g. hinged side facing the equipment, for processing. As a result, reorientation of the jewel case on the conveyor may be required. In some instances, reorientation is accomplished by manually rotating the jewel case. This is obviously very labor cost intensive and subject to human error.

In other instances, reorientation is accomplished via a complex piece of equipment requiring programmable controllers, sensors, timers, air cylinders, stepper motors, etc. This piece of equipment functions to stop the jewel case between two air cylinders and clamp it from the top and bottom. The stepper motor then rotates the jewel case. Afterwards, the air cylinders unclamp and sit the jewel case back onto the conveyor where it continues along its way. This complicated structure because of its multiplicity of moving parts makes the device cumbersome for the operator and technician to use and leads to excessive down time limiting the speed of the product line. Also, the device cannot be conveniently moved from one part of the conveyor to another, and its size leads to an undesirable increase in the length of the product line.

Accordingly, there is a need for an apparatus for rotating an article being moved along an article conveyor that eliminates the above-described disadvantages associated with the prior art.

SUMMARY OF THE INVENTION

It is an object of the present invention to provide an apparatus for rotating an article being moved along an article conveyor that is simple to operate, easy to move and install, and accurately rotates articles. Accordingly, the apparatus of the present invention includes a first housing member mountable on a side of the article conveyor, and a second housing member mountable on the opposite side of the article conveyor. A motor having a shaft is mounted on the first housing member. The motor is arranged to drive a frictional drive roller. The frictional drive roller in turn drives a first end portion of an approaching article. A pin is mounted on the second housing member and arranged to contact a second end portion, i.e., a second end portion opposite the first end portion, of the article while the frictional drive roller drives the first end portion. The pin functions to inhibit motion of the second end portion and thereby establishes a pivot position about which the article rotates approximately ninety degrees. Also mounted on the second housing member is a guide having a tapered leading edge. The guide has a top surface for guiding an article being driven by the frictional drive roller.

Preferably, the article is normally in contact with a top surface of the article conveyor. However, the top surface of the guide and the top surface of the roller are higher than the top surface of the article conveyor. Thus, the article is not in contact with the article conveyor when being driven by the roller. This facilitates rotation as friction associated with the conveyor is avoided.

In another embodiment, the first housing member includes a motor mount for housing the motor. The motor mount is pivotally connected to the first housing member such that moving the motor mount about the pivot adjusts the height of the top surface of the roller.

In still another embodiment, the first and second housing members are removably mounted to the article conveyor such that the apparatus may be easily transferred to different areas along the article conveyor.

The features of the invention which are believed to be novel are further set forth with particularity in the appended claims. The invention itself, however, both as to its organization and operation, together with further objects and advantages thereof, may best be understood by reference to the following description taken in connection with the accompanying drawings.

BRIEF DESCRIPTION OF THE DRAWINGS

For purpose of illustrating the invention, there is shown in the drawings, wherein like parts are designated by like reference numerals or characters, an embodiment which is presently preferred, it being understood, however, that the invention is not limited to the precise arrangement and instrumentality shown.

DETAILED DESCRIPTION OF THE PREFERRED EMBODIMENT

In order to best illustrate the utility of the article rotate device in accord with the present invention, it is described in conjunction with the rotation of a jewel case on a conveyor belt. While the present invention is described hereinafter with particular reference to a jewel case, it is to be understood at the outset of the description which follows that it is contemplated that the apparatus and methods, in accordance with the present invention, may be used with numerous other articles of manufacturer.

Figure 1:
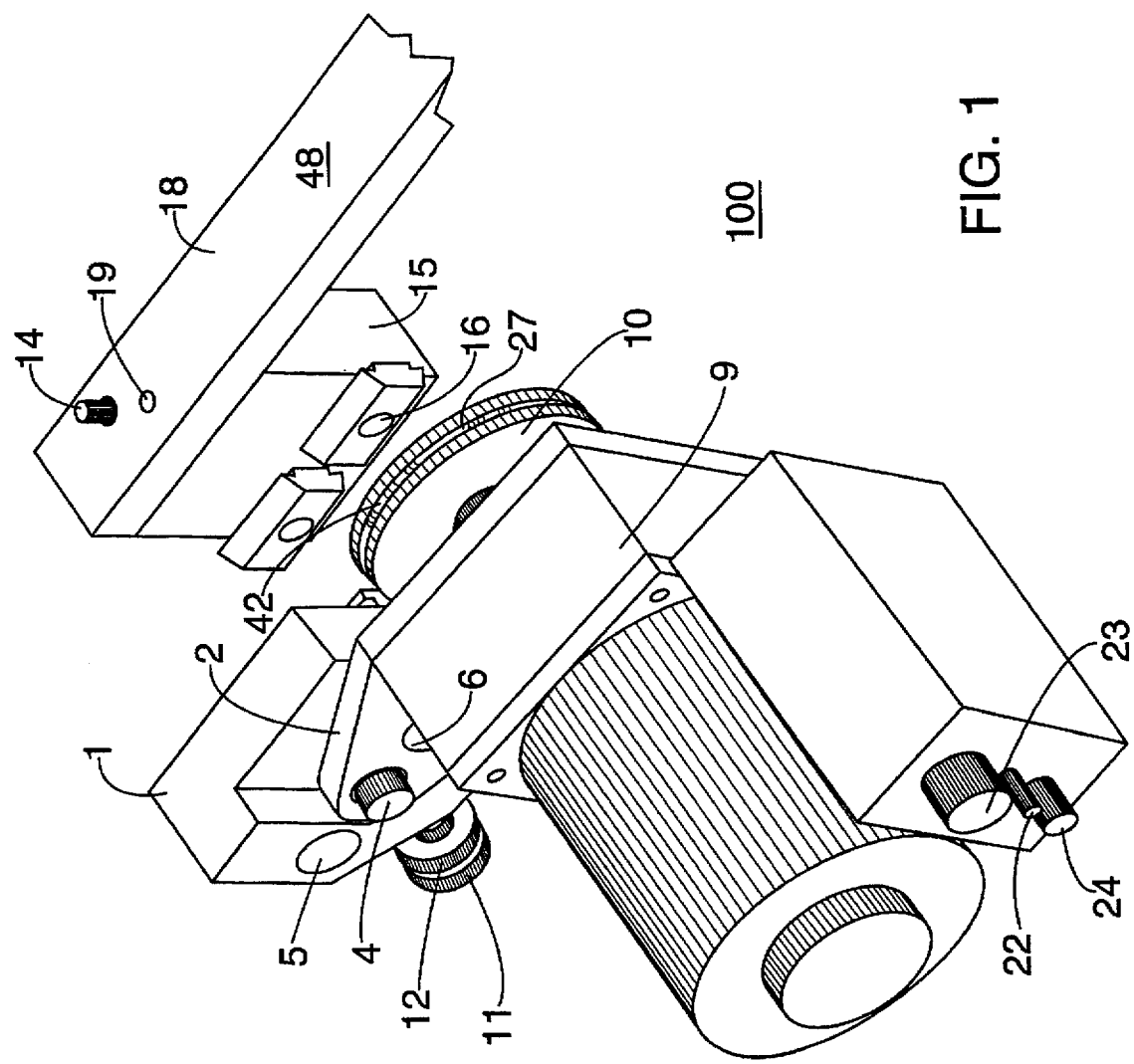
FIG. 1 is the perspective view of an apparatus for rotating an article in accord with the present invention.
Figure 2:
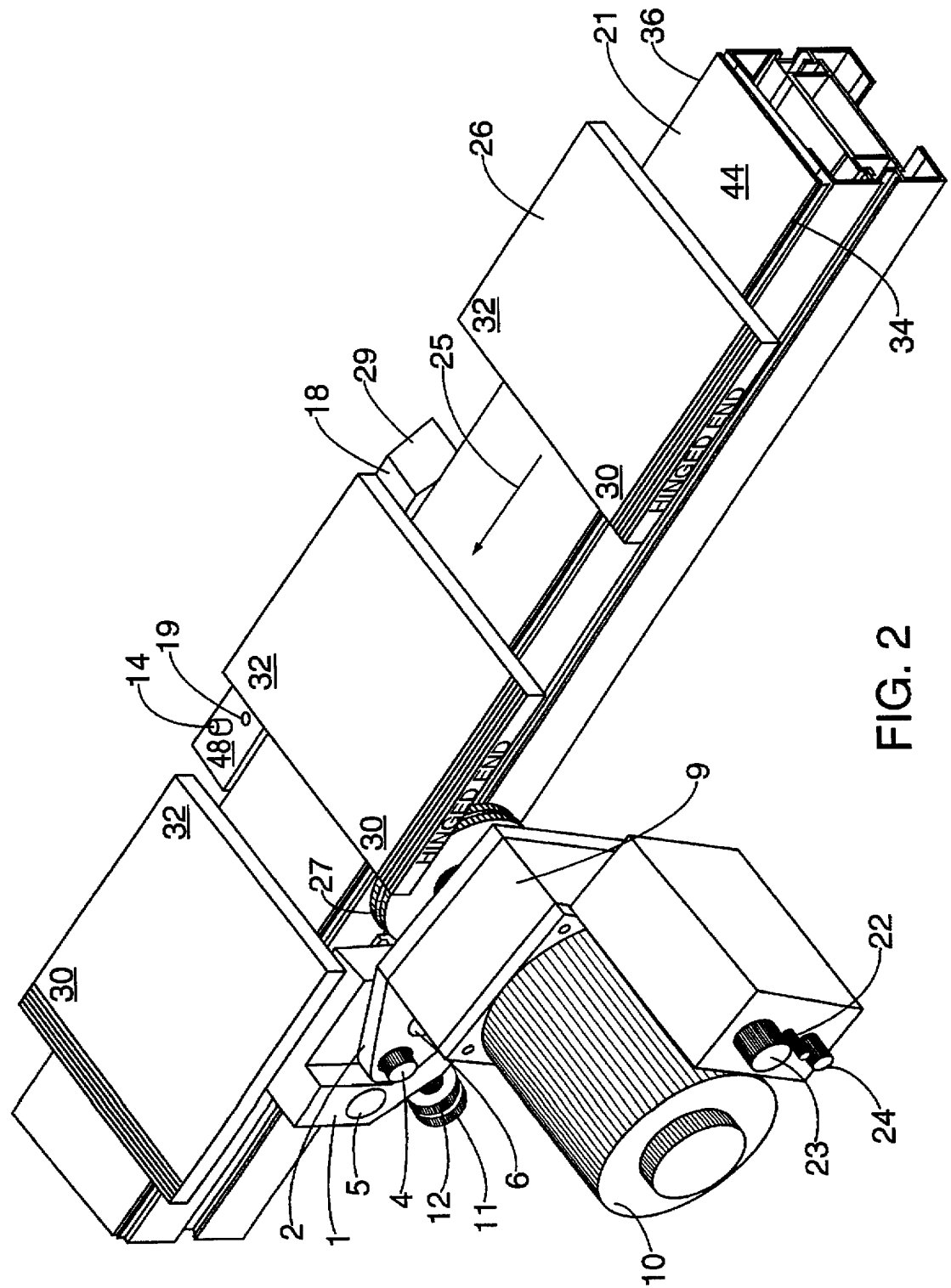
FIG. 2 is a perspective view of the apparatus of FIG. 1 mounted on an article conveyor.

FIG. 1 shows a rotation apparatus 100 in accord with an embodiment of the present invention. The rotation apparatus 100 is a stand alone system that anchors to a side of a conveyor 21 (FIG. 2). In the preferred embodiment, a Flex-Link® conveyor system manufactured by Flex-Link Systems Company, of 1530 Valley Center Parkway, Bethlehem, Pa. 18017, telephone number (215) 861-3733, is employed, however, any number of well known systems would be suitable. FIG. 2 shows a jewel case 26 having a first end portion 30 and a second end portion 32 traveling in a direction 25 along the conveyor 21. The conveyor has opposing sides 34,36 and a top surface 44.

The rotation apparatus 100 is mountable to the conveyor by two separate aluminum pieces, a conveyor mount 1 and a pin mount 15 (FIG. 1). Note that in other embodiments it is possible that the conveyor mount 1 and pin mount 15 are an integral piece. With regard to the specific mounting arrangement of the conveyor mount 1, the conveyor mount 1 is mountable to the conveyor 21 by flat head socket head screws 5 and 6 along with 8-millimeter nuts (not shown). The conveyor mount 1 includes a motor mount 2 having a pressed, sintered bronze bushing with flange 3 (see FIG. 3). The motor mount 2 is attached to the conveyor mount 1 with a shoulder bolt 4. The shoulder bolt 4 passes through the bushing 3 and allows the motor mount 2 to pivot around shoulder bolt 4. A knurled knob 11 can be turned clockwise or counter clockwise in a threaded portion (not shown) of the conveyor mount 1 to pivot the motor mount 2; by so doing it raises or lowers the motor mount 2 in relation to the conveyor 21 (FIG. 2).

Figure 3:
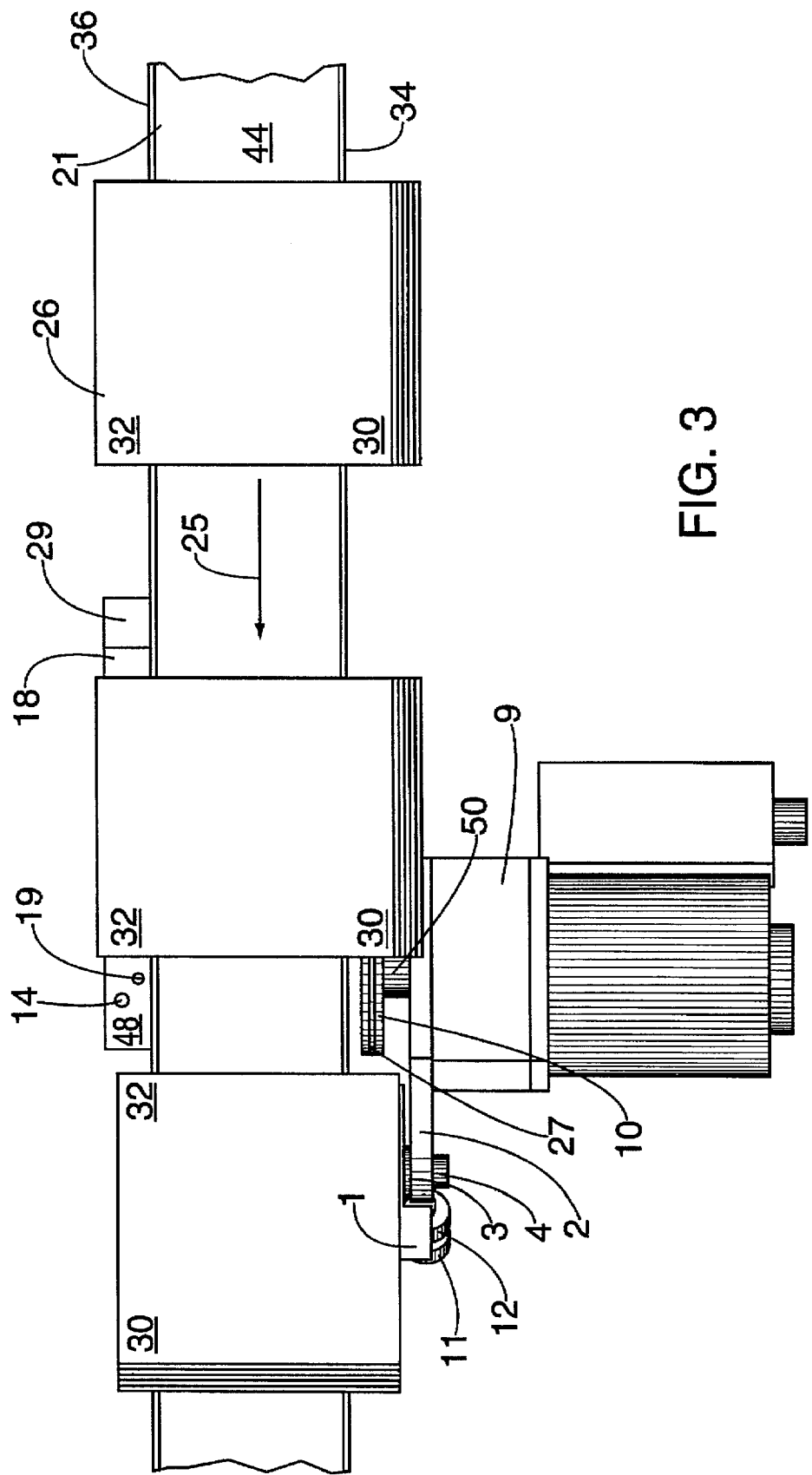
FIG. 3 is a top view of FIG. 2.

A motor 9 is mounted on the motor mount 2. In the preferred embodiment the motor 9 is an Oriental Motor® model PS540-401-115 pinion shaft motor with a model 5GN5KA gearhead (having a five-to-one gear ratio) manufactured by Oriental Motor, 2580 W. 37th St. Torrance, Calif. 90505. For the purposes of clarity, the motor along with its associated gearhead will simply be referenced as motor 9. The motor 9 has an output power rating of 40 W, a speed of 90–1700 RPM and a maximum permissible torque of 87 (lb.-in.). Many other suitable motors will be well known to those of ordinary skill in the art. The motor 9 includes a shaft 50 (FIG. 3). Advantageously, the motor 9 plugs into a standard 110-volt AC outlet so that it can be easily moved. The motor 9 also has a reverse switch 22, a speed pot 23 and an ON/OFF switch 24. Speed pot 23 is used to change the speed of motor 9.

Figure 4:
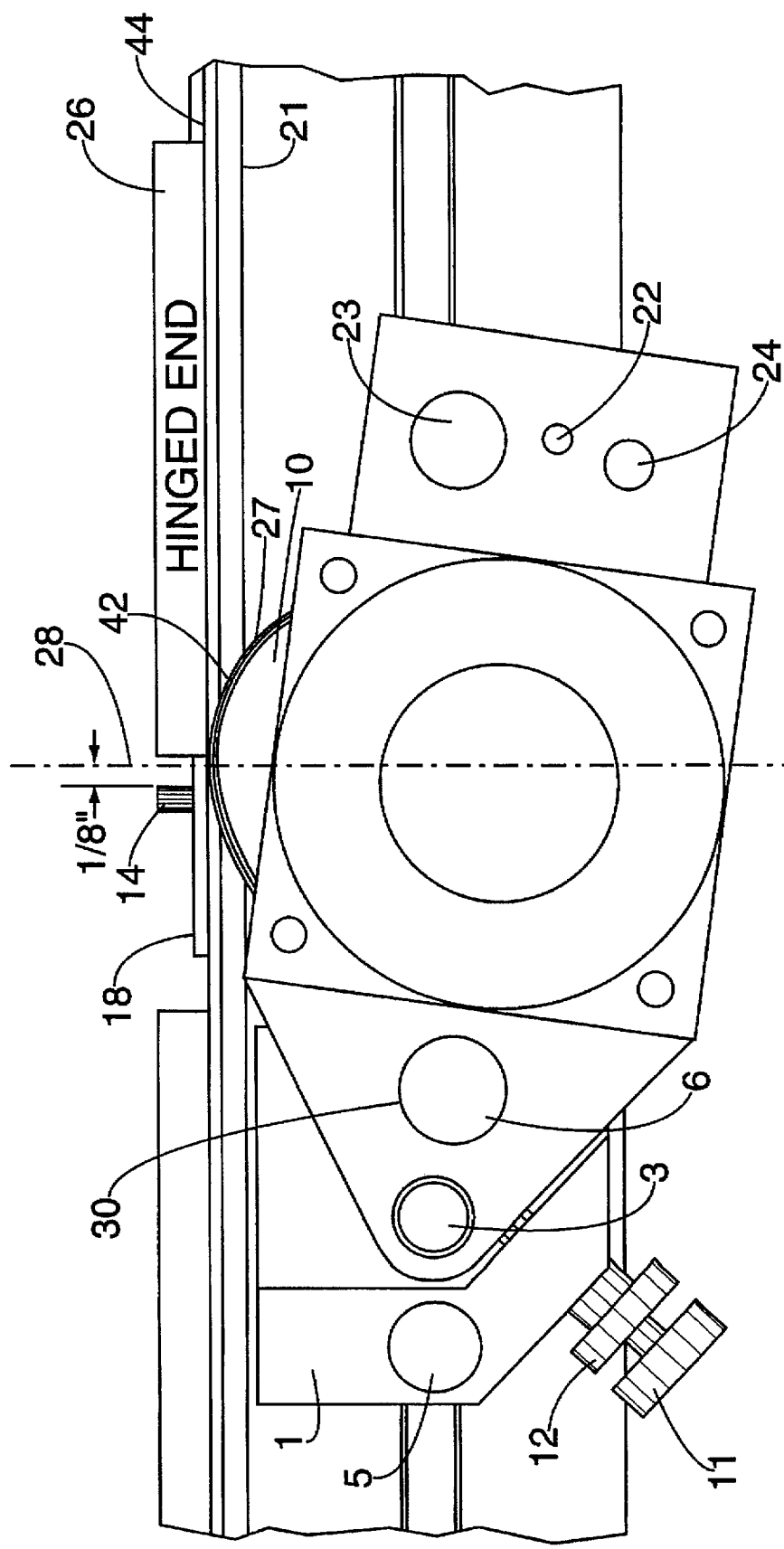
FIG. 4 is a cut-away side view of FIG. 2 showing the details of the motor mount.

Connected to the shaft 50 of the motor 9 is a frictional drive roller 10. The motor 9 drives the frictional drive roller 10 so that the velocity of the frictional drive roller 10 in the direction of motion 25 of the conveyor 21 is greater than the speed of the conveyor 21. The frictional drive roller 10 preferably is made of stainless steel and is 3⅛ inches in diameter. The friction drive roller 10 has a groove (not shown) across its outer diameter in which a flexible o-ring belt 27 is positioned. The o-ring belt 27 has a high coefficient of friction and is made of polyurethane with a hardness of 70-Shore A, and has a cross-section diameter of ⅛-inch. As shown in FIG. 4, the o-ring belt 27 has a top surface 42 preferably positioned ⅛–1/16 inch higher than a top surface 44 of the conveyor 21 (see FIG. 6) so as to lift the first end portion 30 of an approaching jewel case 26 off the top surface 44 of the conveyor 21 and to drive the first end portion 30 of the jewel case 26 (as described in more detail below) in the direction of motion 25 of the conveyor 21. Since the velocity of the frictional drive roller 10 (with o-ring 27) in the direction of motion 25 is greater than the velocity of the conveyor 21, the first end portion 30 will move further in the direction of motion 25 than the second end portion 32, thus rotating the jewel case 26.

Figure 6:
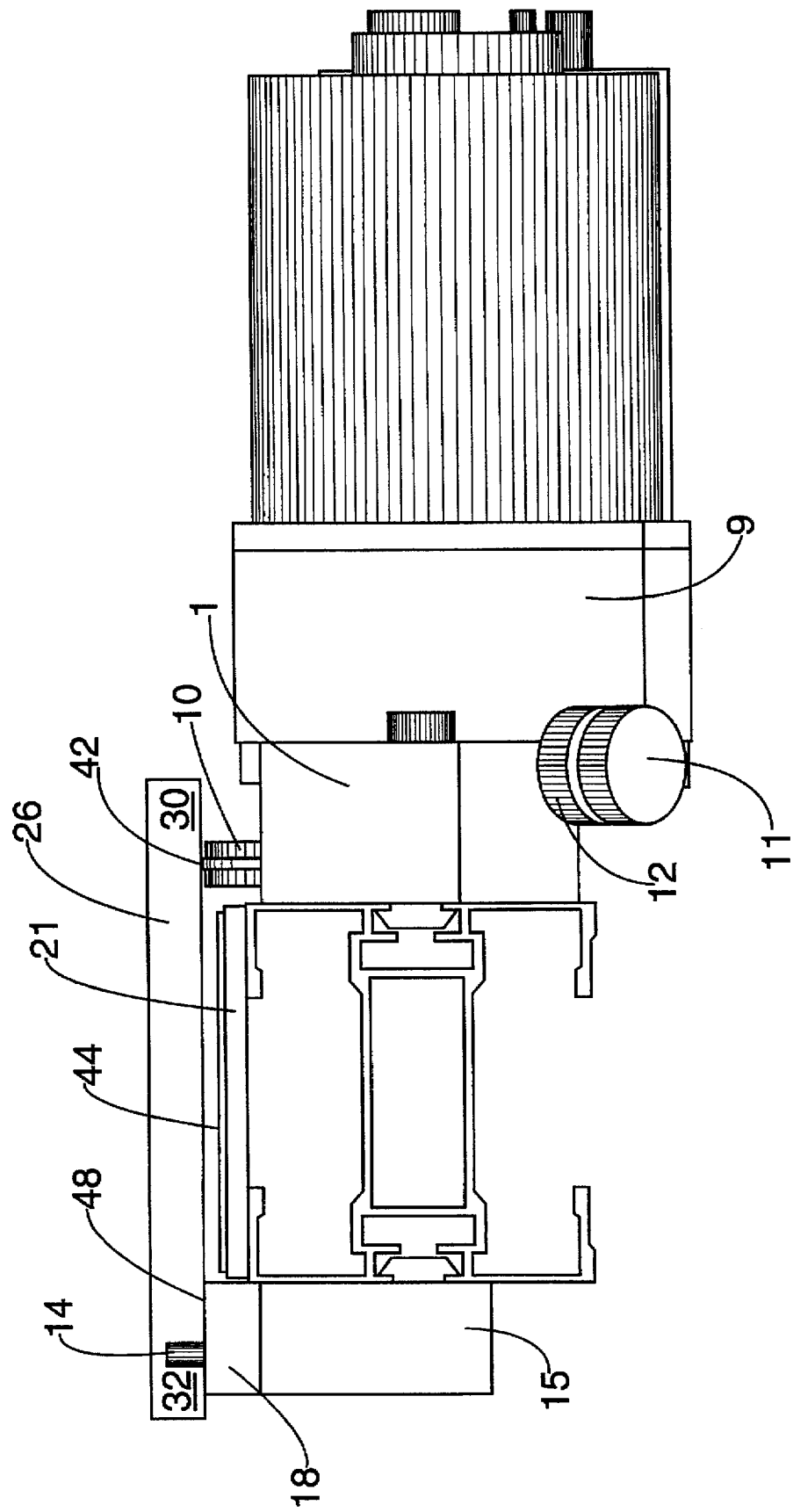
FIG. 6 is a cut-away front view of FIG. 2 showing the article raised off the conveyor.
Figure 7:
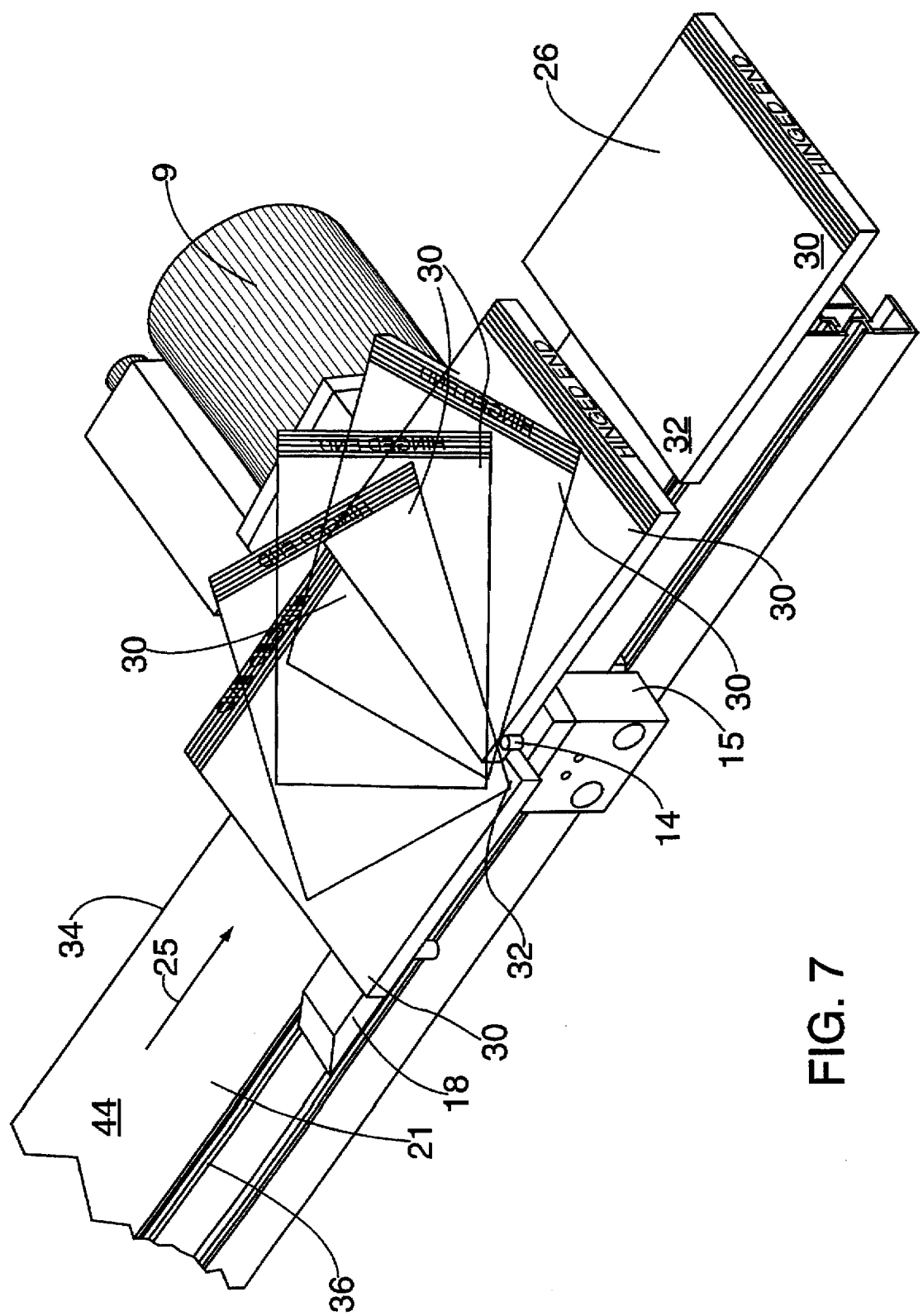
FIG. 7 depicts an article being rotated.

Note that while the frictional drive roller 10 is capable of rotating the jewel case 26 on its own, preferably the pin mount 15 with it associated structure is also provided for facilitating rotation. The pin mount 15 is attached to the conveyor 21 with socket head cap screws 16 along with 8-millimeter nuts (not shown). The pin mount 15 includes a guide 18 a pin 14. In the preferred embodiment, the guide 18 is a separate piece attached to the pin mount 15, however, it should be understood by those of ordinary skill in the art that the pin mount 15 and the guide 18 may be integral. A top surface 48 of the guide 18 is positioned ⅛ to 1/16 inch higher than the top surface 44 of the conveyor 21 (FIG. 6) and has a tapered leading edge 29 (FIG. 2). The guide 18 functions to slightly lift the jewel case 26 (or other work piece) off conveyor 21 as it is rotated to keep the product from dragging on the top 44 of conveyor 21, thus facilitating its rotation (FIG. 6). The pin 14, which is housed in the pin mount 15, is aligned approximately ⅛-inch past a center line 28 of frictional drive roller 10 as illustrated in FIG. 4. As shown in FIG. 7, the pin 14 is positioned to stop the forward momentum of the second end portion 32 of the jewel case 26 (or other work piece) so to assist in the rotation of the jewel case 26 by establishing a pivot position while the first end portion 30 is being driven by the frictional drive roller 10. When the first end portion 30 of the jewel case 26 is driven approximately 90 degrees through the direction of motion 25, the pin 14 will naturally lose contact with the second end portion 32, thus allowing the jewel case 26 (now rotated 90 degrees) to continue on its way as shown in FIG. 7.

To keep the guide 18 and pin 14 rigidly mounted to conveyor 21, a threaded pin 19 screws into the bottom of guide 18 and then fits into a hole in pin mount 15. (FIG. 1 shows the threaded pin 19 already screwed in). Set screws 17 (FIG. 5) are then used to fix pin 19 and pin 14 to pin mount 15. In the preferred embodiment, the guide 18 is made of Delrin® which has a low coefficient of friction which helps prevent the scratching of jewel case 26.

As noted above, the jewel case 26 is rotated by driving one end portion 30 with the roller 10 and at the same time inhibiting motion and establishing a pivot position with the other end portion 32 via the pin 14. For this process, it is important that the height of a top surface 42 of the o-ring mounted on the roller 10 be properly adjusted. If the top surface 42 is too low, the jewel case 26 will drag on the surface 44 of the conveyor 21 thereby slowing rotation. If the top 42 is too high, a loss of control is possible. Accordingly, the present invention allows the motor housing 2 to be raised and lowered by pivoting on the conveyor mount 1 (as described above) thereby raising and lowering the height of the top surface 42. This insures that appropriate contact (i.e., the top surface 42 of the o-ring 1/16–⅛ inch higher than the surface 44 of the conveyor 21 as shown in FIG. 7) is achieved. As described above, the adjustment of the motor housing 2 is made by turning the knurled knob 11 in the conveyor mount 1. Furthermore, to keep the knurled knob 11 from changing position due to vibration, the adjustment can be locked in by turning a knurled nut 12 against the conveyor mount 1. Threads in the conveyor mount 1 which accommodate the knurled knob 11 advantageously have formed screw thread coils (not shown) to reduce thread wear in the aluminum material used for the conveyor mount 1. Also, the flange of bushing 3 (FIG. 4) is located between conveyor mount 1 and motor mount 2 to provide a low friction wear surface for pivoting the motor mount 2 as previously described.

Figure 5:
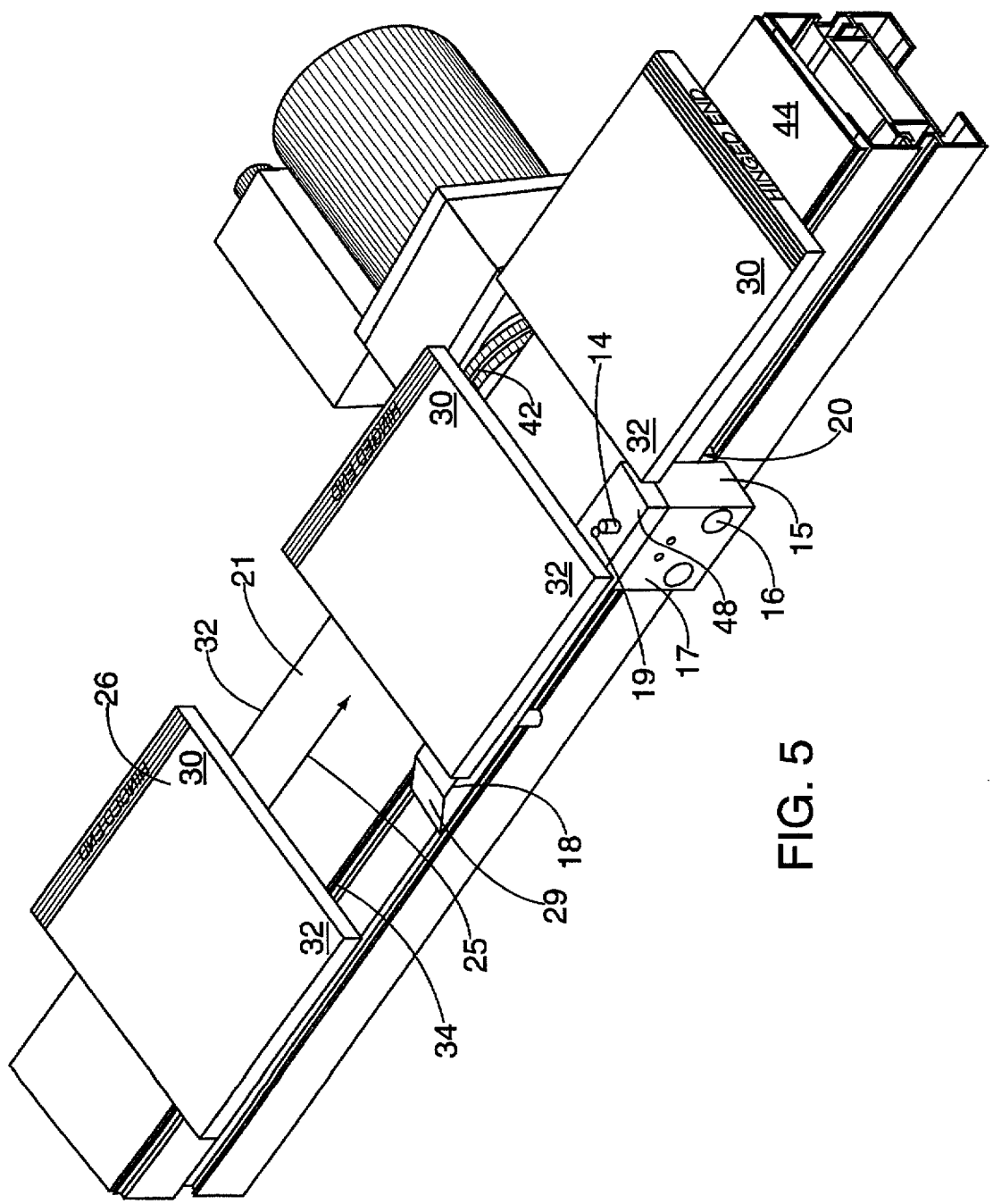
FIG. 5 is the apparatus of FIG. 1 mounted on the opposite side of an article conveyor moving in the opposite direction from that shown in FIG. 2.

Advantageously, the assembly housed on conveyor mount 1 including motor mount 2 can be detached by removing screws 5 and 6. Furthermore, one does not need to detach the motor mount 2 to access screw 6. An access hole 30 (FIG. 4) located in motor mount 2 is provided to accommodate the removal of screw 6. The pin mount 15 and its accompanying components including guide 18 can be detached by removing screws 16. Once all is removed, the rotation apparatus 100 can easily be attached to a different location along the conveyor 21. It may also be desirable, if the rotation apparatus 100 is going to be relocated often, to have more than one conveyor mount 1. Then, only the shoulder bolt 4 needs to be removed to disconnect the motor mount 2, leaving the conveyor mount 1 in its present location. The motor mount 2 can then be reattached to the other conveyor mount 1. The same can be done with the guide 18 (including pin 14 and pin 19) by having multiple pin mounts 15. Furthermore, reverse switch 22 of motor 9 allows the motor 9 to be mounted on the opposite side of a conveyor running in an opposite direction as shown in FIG. 5.

As described above, the speed of the motor 9 is adjustable. The speed of the motor 9 can also effect the rotational speed of jewel case 26. Typically the faster motor 9 runs the more pieces per minute of jewel case 26 can run on the conveyor 21. The slower motor 9 runs the slower jewel case 26 rotates, thus the less pieces per minute can run on the conveyor 21.

It should be noted that the above description is a detailed description of the preferred embodiment of the present invention. The invention, however, is not so limited. For example, the apparatus of the present invention could be used to rotate any type of article or work piece on numerous types of conveyor systems. While the housing is shown as three separate pieces, two of which are bolted to the conveyor, any number of arrangements for the housing are contemplated such as welding an integral housing member to the conveyor. Furthermore, specific model numbers, diameters, screw sizes, etc. are described throughout. It is, of course, farther contemplated that these could be replaced by well known equivalents in many cases or even eliminated entirely in some cases.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An apparatus for rotating an article being moved along a direction of motion of an article conveyor having a given direction of motion, said article having a first and a second end portion and said article conveyor having a first and a second side and a top surface normally in contact with said article, comprising:

a first housing member removably mountable to said first side of said article conveyor;

a second housing member removably mountable to said second side of said article conveyor;

a motor housing pivotally connected to said first housing member;

a motor having a shaft, said motor mounted on said motor housing;

a roller coupled to said shaft and driven in substantially said given direction of motion, said roller having a top surface higher than said top surface of said article conveyor, and said roller positioned to drive said first end portion of said article;

a guide having a tapered leading edge mounted on said second housing member and having a top surface higher than said top surface of said article conveyor such that said article is not in contact with said top surface of said article conveyor when said first end portion of said article is being driven by said roller; and a pin mounted on said second housing member and positioned to inhibit motion of said second end portion while said roller drives said first end portion thereby establishing a pivot position such that said first end portion rotates substantially ninety degrees through said direction of motion.

2. An apparatus for rotating an article being moved along an article conveyor having a given direction of motion, said article having a first and a second end portion and said article conveyor having a first and a second side, comprising:

a first housing member mountable on said first side of said article conveyor;

a second housing member mountable on said second side of said article conveyor;

a motor mounted on said first housing member;

frictional drive means, including a roller having a center line and a top surface for contacting said article, coupled to said motor and positioned to drive said first end portion as said article reaches said frictional drive means; and a pin mounted on said second housing member and substantially aligned with said center line of said roller, said pin arranged to inhibit motion of said second end portion while said frictional drive means drives said first end portion thereby establishing a pivot position around which said article rotates.

3. An apparatus for rotating an article being moved along an article conveyor having a given direction of motion, said article having a first and a second end portion and said article conveyor having a first and a second side, comprising:

a first housing member mountable on said first side of said article conveyor;

a second housing member mountable on said second side of said article conveyor;

a motor mounted on said first housing member;

frictional drive means, including a roller having a center line and a top surface for contacting said article, coupled to said motor and positioned to drive said first end portion as said article reaches said frictional drive means; and a pin mounted on said second housing member and positioned substantially ⅛ inch further in said given direction than said center line of said roller, said pin arranged to inhibit motion of said second end portion while said frictional drive means drives said first end portion thereby establishing a pivot position around which said article rotates.

4. An apparatus for rotating an article being moved along an article conveyor having a given direction of motion, said article having a first and a second end portion and said article conveyor having a top surface and a first and a second side, comprising:

a first housing member mountable on said first side of said article conveyor;

a motor mounted on said first housing member;

frictional drive means, including a roller having a top surface higher than said top surface of said article conveyor for contacting said article, coupled to said motor and positioned to drive said first end portion as said article reaches said frictional drive means, said article normally being in contact with said top surface of said article conveyor but not in contact with said top surface of said article conveyor when being driven by said roller;

a second housing member mountable on said second side of said article conveyor and including a guide member having a top surface higher than said top surface of said article conveyor for guiding said article as said article is being driven by said roller;

means for adjusting height of said top surface of said roller with respect to said top surface of said article conveyor; and an upstanding member mounted on said second housing member and arranged to inhibit motion of said second end portion while said frictional drive means drives said fist end portion thereby establishing a pivot position around which said article rotates.

5. The apparatus according to claim 4 wherein said first housing member includes a motor mount for housing said motor, said motor mount pivotally connected to said first housing member, wherein moving said motor mount about the pivot adjusts the height of said top surface of said roller.

6. An apparatus for rotating an article having first and second ends, comprising:

a conveyor having a top surface arranged to carry said article in a predetermined direction of motion, said article normally in contact with said top surface of said conveyor;

a housing member mounted on said conveyor and including first and second portions, said second portion including a guide member having a top surface higher than said top surface of said conveyor for guiding said article as said article is being driven by said roller;

a motor having a shaft and mounted on said housing member;

a roller mounted on said first portion of said housing member and coupled to said shaft so as to be driven by said shaft substantially is said predetermined direction of motion, said roller having a top surface higher than said top surface of said conveyor and positioned to frictionally drive said first end of said article such that said article is not in contact with said top surface of said conveyor when said article is being driven by said roller;

means for adjusting height of said top surface of said roller; and an upstanding member mounted on said second portion of said housing member and arranged to inhibit motion of said second end of said article while said roller drives said fist end of said article such that said first end of said article moves further in said predetermined direction of motion than said second end of said article.

* * * * *